(12) United States Patent
Huang et al.

(10) Patent No.: US 8,856,562 B2
(45) Date of Patent: *Oct. 7, 2014

(54) SWITCHED CAPACITOR VOLTAGE REGULATOR WITH HIGH EFFICIENCY OVER A WIDE VOLTAGE RANGE

(71) Applicant: Intel Corporation, Santa Clara, CA (US)

(72) Inventors: Lilly Huang, Portland, OR (US); Krishnan Ravichandran, Saratoga, CA (US); Rinkle Jain, Portland, OR (US); Tomm V. Aldridge, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,831

(22) Filed: Apr. 15, 2013

(65) Prior Publication Data

US 2013/0241518 A1    Sep. 19, 2013

Related U.S. Application Data

(63) Continuation of application No. 12/654,000, filed on Dec. 22, 2009, now Pat. No. 8,423,800.

(51) Int. Cl.
- *G06F 1/26* (2006.01)
- *H02M 3/07* (2006.01)
- *G05F 3/02* (2006.01)

(52) U.S. Cl.
CPC .. *G05F 3/02* (2013.01); *H02M 3/07* (2013.01)
USPC .......................................... 713/300; 713/320

(58) Field of Classification Search
USPC .................................................. 713/300, 320
See application file for complete search history.

(56) References Cited

U.S. PATENT DOCUMENTS

| | | | | |
|---|---|---|---|---|
| 5,969,513 | A | * | 10/1999 | Clark ............................. 323/282 |
| 6,230,276 | B1 | * | 5/2001 | Hayden ......................... 713/320 |
| RE37,708 | E | * | 5/2002 | Danstrom ..................... 323/284 |
| 7,190,210 | B2 | * | 3/2007 | Azrai et al. ................... 327/536 |
| 7,375,992 | B2 | * | 5/2008 | Mok et al. ....................... 363/60 |
| 8,063,618 | B2 | * | 11/2011 | Lam et al. .................... 323/282 |
| 2007/0145962 | A1 | * | 6/2007 | Huang et al. ................. 323/283 |
| 2010/0072961 | A1 | * | 3/2010 | Kosonocky et al. .......... 323/281 |
| 2010/0080023 | A1 | * | 4/2010 | Jain ................................ 363/65 |
| 2010/0153756 | A1 | * | 6/2010 | Huang et al. ................. 713/300 |
| 2011/0260763 | A1 | * | 10/2011 | Wang ............................ 327/157 |

* cited by examiner

*Primary Examiner* — Kim Huynh
*Assistant Examiner* — Zahid Choudhury
(74) *Attorney, Agent, or Firm* — Jordan IP Law, LLC

(57) ABSTRACT

In some embodiments, a voltage regulator device may include a switched capacitor voltage regulator to receive an input voltage and to provide an output voltage to a load, and a control unit to receive information related to a desired output voltage for the switched capacitor voltage regulator and to determine a desired input voltage for the switched capacitor voltage regulator based on the desired output voltage and selected operation mode or modes of switched capacitor voltage regulator. Other embodiments are disclosed and claimed.

10 Claims, 5 Drawing Sheets

SWITCHED CAPACITOR VOLTAGE REGULATOR WITH HIGH EFFICIENCY OVER A WIDE VOLTAGE RANGE

RELATED APPLICATION

The present application is a continuation of U.S. patent application Ser. No. 12/654,000, filed on Dec. 22, 2009, entitled "SWITCHED CAPACITOR VOLTAGE REGULATOR WITH HIGH EFFICIENCY OVER A WIDE VOLTAGE RANGE".

The invention relates to voltage regulators and more particularly to switched capacitor voltage regulators.

BACKGROUND AND RELATED ART

Voltage converters are well known in the art. U.S. Pat. No. 5,880,945 describes a power conversion system where the active components of the power conversion system are integrated into the integrated circuit for which power is being supplied.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
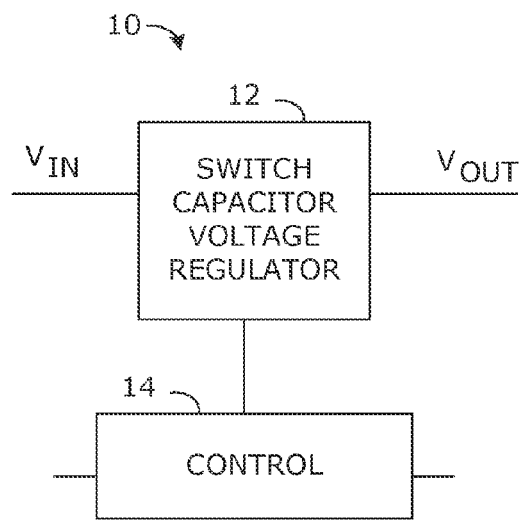
FIG. 1 is a block diagram of a voltage regulator device in accordance with some embodiments of the invention.

With reference to FIG. 1, in accordance with some embodiments of the invention a voltage regulator device 10 may include a switched capacitor voltage regulator 12 to receive an input voltage $V_{IN}$ and to provide an output voltage $V_{OUT}$ (e.g. to a load) and a control unit 14 to receive information related to a desired output voltage $V_{OUT}$ for the switched capacitor voltage regulator 12 and to determine a desired input voltage $V_{IN}$ for the switched capacitor voltage regulator 12 based on the desired output voltage $V_{OUT}$ (and/or selected operation mode or modes of the switched capacitor voltage regulator 12). For example, the control unit 14 may be further configured to provide control information related to the desired input voltage $V_{IN}$. For example, the load may include a processor and the information related to the desired output voltage may include information related to processor performance demands. For example, in some embodiments of the invention the control unit 14 may be configured to determine the desired input voltage based on information related to one or more of a processor voltage identification, a processor load prediction and a conversion ratio of the switched capacitor voltage regulator 12. In some embodiments of the invention, the switched capacitor voltage regulator 12, the control unit 14, and the processor may be co-located on a same integrated circuit die.

Figure 2:
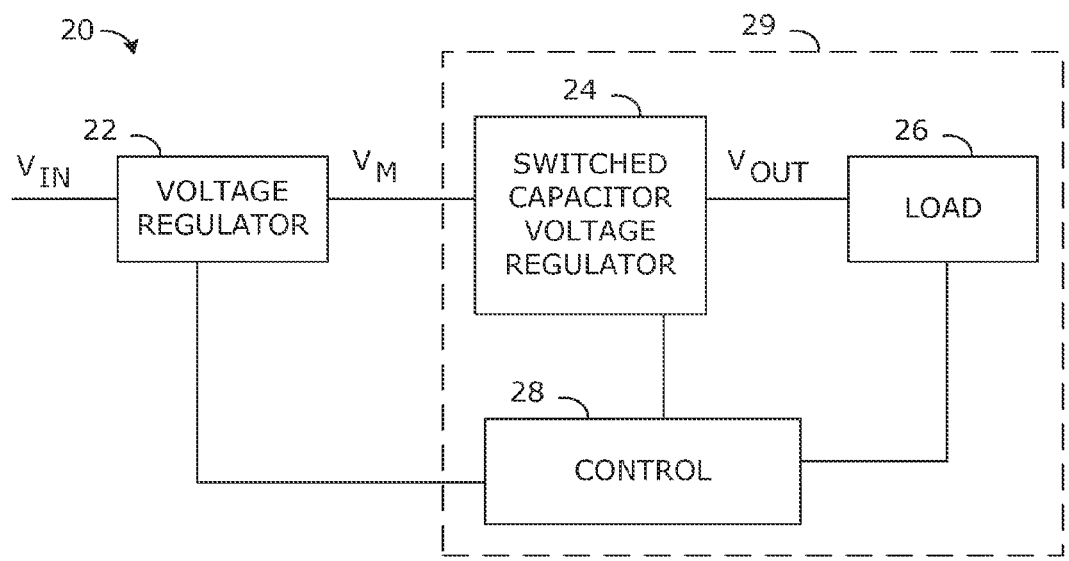
FIG. 2 is a block diagram of an electronic system in accordance with some embodiments of the invention.

With reference to FIG. 2, in accordance with some embodiments of the invention an electronic system 20 may include a first voltage regulator device 22 to receive an input voltage $V_{IN}$ and to provide an intermediate voltage $V_M$, a second voltage regulator device 24 to receive the intermediate voltage $V_M$ and to provide an output voltage $V_{OUT}$, where the second voltage regulator device includes a switched capacitor voltage regulator, a load circuit 26 coupled to the output voltage $V_{OUT}$, and a control unit 28 coupled between the load circuit 26 and the first voltage regulator device 22, where the control unit 28 is configured to receive information related to a desired output voltage $V_{OUT}$ for the switched capacitor voltage regulator 24 and to determine a desired intermediate voltage $V_M$ for the switched capacitor voltage regulator 24 based on the desired output voltage $V_{OUT}$.

For example, the control unit 28 may be further configured to provide control information relating to the desired intermediate voltage $V_M$ to the first voltage regulator 22. For example, the first voltage regulator 22 may be configured to adjust the intermediate voltage $V_M$ based on the control information received from the control unit 28. For example, the first voltage regulator 22 may include a buck converter having a variable duty cycle and the buck converter may be configured to adjust the duty cycle based on the control information received from the control unit 28 (e.g. to provide the desired intermediate voltage $V_M$).

In some embodiments of the electronic system 20, the load circuit 26 may include a processor and the information related to the desired output voltage $V_{OUT}$ may include information related to processor performance demands. For example, the control unit 28 may be configured to determine the desired intermediate voltage $V_M$ based on information related to one or more of a processor voltage identification, a processor bad prediction and a conversion ratio of the switched capacitor voltage regulator. In some embodiments of the electronic system 20, the switched capacitor voltage regulator 24, the control unit 28, and the processor 26 may be co-located on a same integrated circuit die 29. For example, the integrated circuit including the switched capacitor voltage regulator 24, the processor 26, and the control unit 28 may be a system-on-a-chip (SOC) 29.

Figure 3:
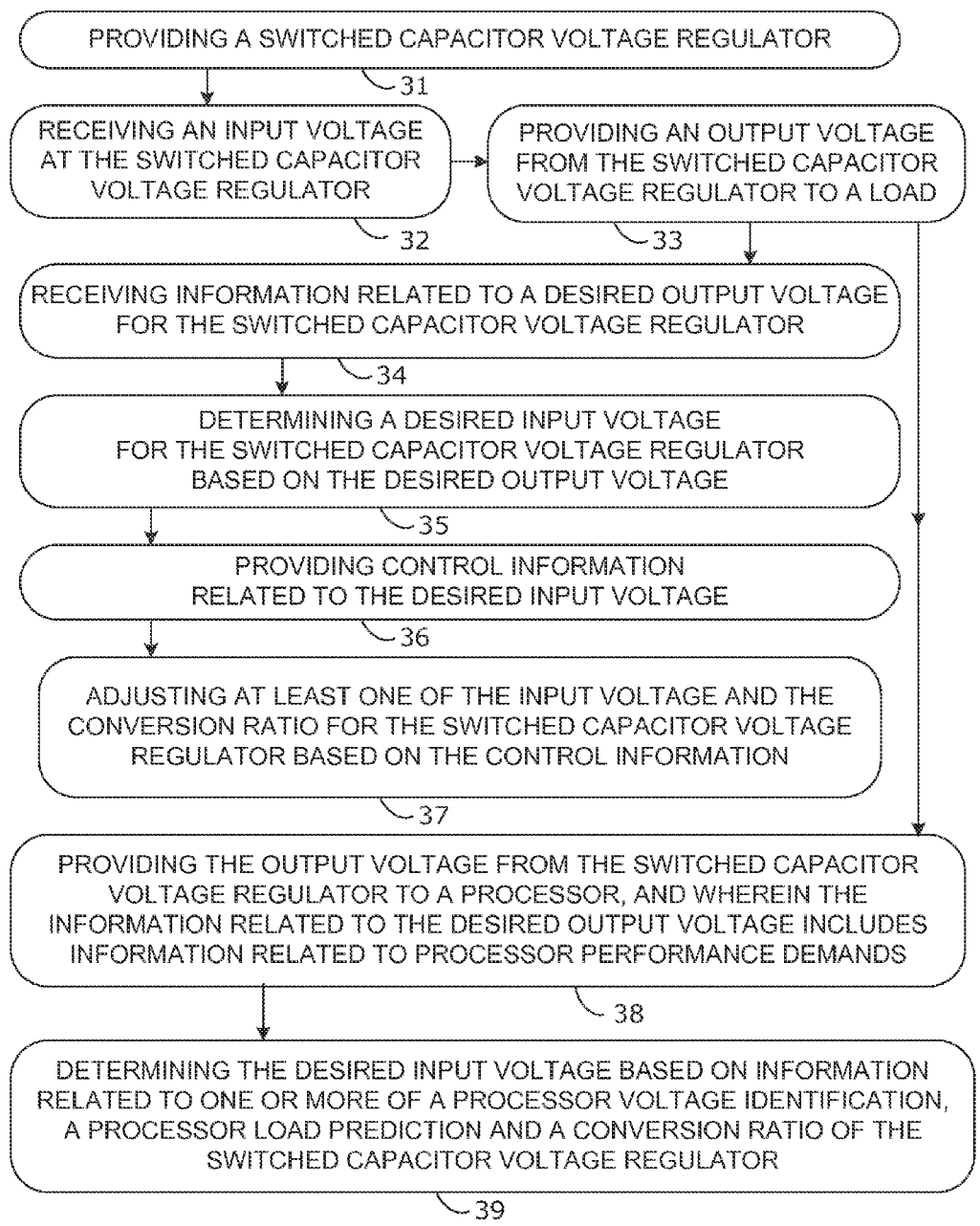
FIG. 3 is a flow diagram in accordance with some embodiments of the invention.

With reference to FIG. 3, a method of operating a voltage regulator in accordance with some embodiments of the invention may include providing a switched capacitor voltage regulator (e.g. at block 31), receiving an input voltage at the switched capacitor voltage regulator (e.g. at block 32), providing an output voltage from the switched capacitor voltage regulator to a load (e.g. at block 33), receiving information related to a desired output voltage for the switched capacitor voltage regulator (e.g. at block 34), and determining a desired input voltage for the switched capacitor voltage regulator based on the desired output voltage (e.g. at block 35).

For example, some embodiments of the invention may further include providing control information related to the desired input voltage (e.g. at block 36), Some embodiments of the invention may further include adjusting at least one of the input voltage and the conversion ratio for the switched capacitor voltage regulator based on the control information (e.g. at block 37).

In some embodiments of the invention, providing the output voltage from the switched capacitor voltage regulator to the load may include providing the output voltage from the switched capacitor voltage regulator to a processor, and the information related to the desired output voltage may include information related to processor performance demands (e.g. at block 38), For example, in some embodiments of the invention, determining the desired input voltage for the switched capacitor voltage regulator based on the desired output voltage may include determining the desired input voltage based on information related to one or more of a processor voltage identification, a processor bad prediction and a conversion ratio of the switched capacitor voltage regulator (e.g. at block 39).

Advantageously, some embodiments of the invention may provide an enhanced CPU power delivery scheme with a switched capacitor voltage regulator. For example, some embodiments of the invention may address the complexity of satisfying two trends that pull CPU power delivery solutions in opposing directions. The first trend relates to tighter requirements on the CPU supply voltage (e.g. tolerance level) as the process moves to smaller and smaller geometries. For example, some embodiments of the invention may provide fine grain voltage steps for each frequency bin in order to run the CPU at relatively low or the lowest possible power for that frequency. The second trend relates to integrated VR circuits on the CPU die itself (sometimes referred to as FiVR—Fully Integrated Voltage Regulator).

For example, some FiVR designs may include one or more switched capacitor voltage regulators (SCVRs), which generally don't use any inductors. An example of a switched capacitor voltage regulator is described in U.S. patent application Ser. No. 12/242,584, filed Sep. 30, 2008, and entitled SWITCHED CAPACITOR VOLTAGE REGULATOR, which is incorporated by reference herein in its entirety.

In some systems, one or more SCVRs may be integrated on the die with a processor and may all run off a single fixed voltage generated by a buck VR on the platform. For example, the buck VR may generate the single fixed voltage from an input voltage. For example, the single fixed voltage may be a value determined by the highest voltage that the CPU process can tolerate to meet reliability requirements.

In some systems, the two trends described above may have conflicting forces since an SCVR may operate more efficiently at discrete voltage levels set at integer ratios between input and output voltages. For example, any voltage regulated away from these discrete voltage points may cause an increase of power consumption linearly (e.g. approximately $V_N$-$K_N$), or sometimes even worse in the power of 2 (e.g. approximately $(V_N$-$K_N)^2$).

However, the CPU may operate better at very closely spaced voltage points. For example, a preferred operating point for the CPU may be at a voltage level between any two of these consecutive discrete voltage points. Operating at a voltage level between the two discrete voltage points may cause significant power loss due to CPU power delivery in order to achieve a fine grain CPU supply voltage. For example, the output voltage may only be regulated efficiently at discrete voltage points rather than continuous adjustable VIDs (ex: VRM 11 Spec. 12.5 mV resolution) demanded from the CPU.

The output voltage, $V_{OUT}$, is the function of the input voltage, $V_{IN}$ in the relationship of:

$V_{OUT}=n/m \; V_M$, to optimize SCVR efficiency, where n, m are integers $V_M=D \; V_{IN}$, where, D is a constant value representing step-down voltage conversion ratio.

Therefore, $V_{OUT}=(D*n/m)V_{IN}$

For example, if $V_{IN}$ is 5V, a buck VR with step-down ratio of 5 will give the intermediate voltage of $V_M$ of 1V. Assume that SCVR can work on multiple conversion ratios of n/m, 1/3, 2/3 and 3/4. Therefore, such a power delivery network operates more efficiently at the output voltages of 0.333V, 0.666V and 0.750V. Power efficiency will reduce significantly away from these three voltage levels if CPU performance demands to have a different supply voltage.

Figure 4:
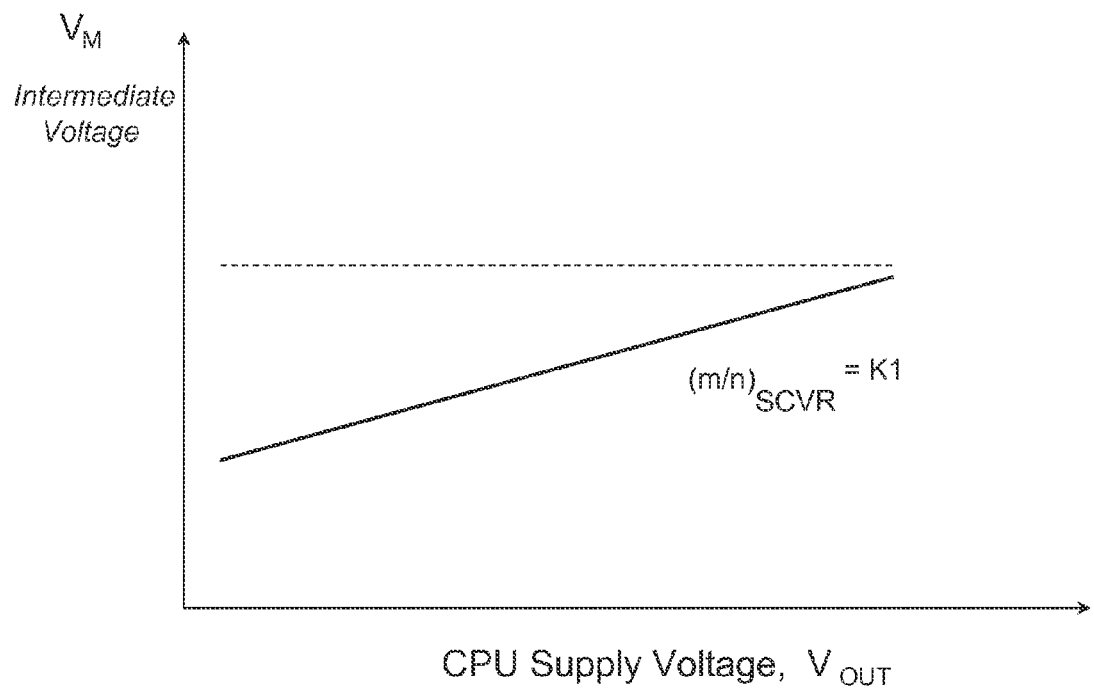
FIG. 4 is a graph of CPU supply voltage versus an intermediate voltage in accordance with some embodiments of the invention.

With reference to FIG. 4, a graph of an intermediate voltage $V_M$ versus CPU supply voltage $V_{OUT}$ illustrates an example principle of some embodiments of the invention. Instead of a fixed value of the intermediate voltage level (e.g. the dashed line in FIG. 4), some embodiments of the invention may utilize a variable value of $V_M$ (e.g. the solid line in FIG. 4 with a constant slope (e.g. $K1=(m/n)_{SCVR}$). Advantageously, some embodiments of the invention may address the problem of power loss/reduction of SCVR power delivery for CPU applications which require or benefit from fine grain voltage steps. For example, some embodiments of the invention may adjust the intermediate voltage, $V_M$, on-the-fly based on CPU supply voltage requirements while integer conversion ratios of the 2nd stage VR, the SCVR, are held constant.

Figure 5:
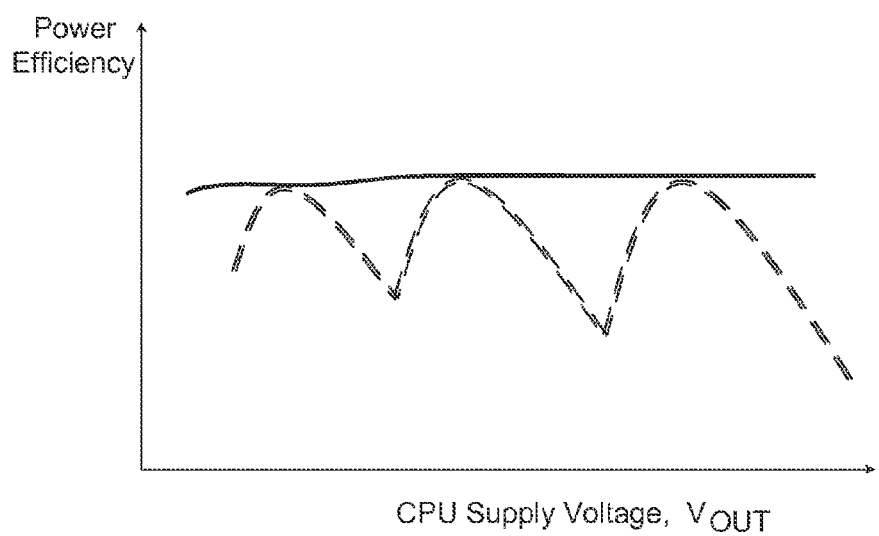
FIG. 5 is a graph of CPU supply voltage versus power efficiency in accordance with some embodiments of the invention.

With reference to FIG. 5, a graph of CPU supply voltage versus power efficiency illustrates an example principle of some embodiments of the invention. A fixed intermediate voltage (e.g. corresponding to the dashed line in FIG. 4) provides efficient operation at discrete CPU supply voltage points but with efficiency falling off substantially between those discrete voltage points (e.g. corresponding to the dashed line in FIG. 5). In accordance with some embodiments of the invention, adjusting the intermediate voltage (e.g. corresponding to the solid line in FIG. 4) provides efficient operation across a wide range of CPU supply voltages (e.g. corresponding to the solid line in FIG. 5). Advantageously, some embodiments of the invention may provide substantially continuous or fine grain supply voltage steps to meet CPU demands while also providing relatively high or higher efficiency for the SCVR at discrete voltage points.

Figure 6:
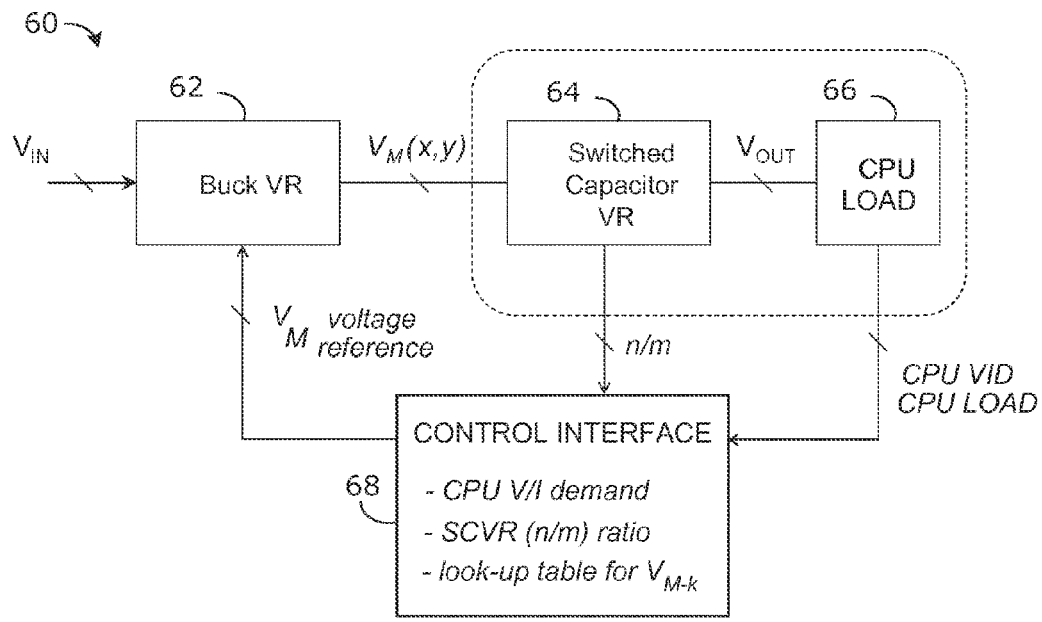
FIG. 6 is a block diagram of another voltage regulator device in accordance with some embodiments of the invention.

With reference to FIG. 6, in accordance with some embodiments of the invention an electronic system 60 may include a first voltage regulator device, e.g. buck VR 62, to receive an input voltage $V_{IN}$ and to provide an intermediate voltage $V_M(x,y)$, a second voltage regulator device 64 to receive the intermediate voltage $V_M$ and to provide an output voltage $V_{OUT}$, where the second voltage regulator device includes a switched capacitor voltage regulator, a load circuit, e.g. CPU load 66, coupled to the output voltage $V_{OUT}$, and a control unit, e.g. control interface 68, coupled between the CPU load 66 and the buck VR 62, where the control interface 68 is configured to receive information related to a desired output voltage $V_{OUT}$ for the switched capacitor voltage regulator 64 and to determine a desired intermediate voltage $V_M$ for the switched capacitor voltage regulator 64 based on the desired output voltage $V_{OUT}$.

For example, the control interface 68 may be further configured to provide control information relating to the desired intermediate voltage $V_M$ to the buck VR 62. For example, the buck VR 62 may be configured to adjust the intermediate voltage $V_M$ based on the control information received from the control interface 68. For example, the buck VR 62 may include a buck converter having a variable duty cycle and the buck converter may be configured to adjust the duty cycle based on the control information received from the control interface 68 (e.g. to provide the desired intermediate voltage $V_M$).

In some embodiments of the electronic system 60, the CPU load 66 may include a processor and the information related to the desired output voltage $V_{OUT}$ may include information related to processor performance demands. For example, the control interface 68 may be configured to determine the desired intermediate voltage $V_M$ based on information related to one or more of a processor voltage identification (VID), a processor load prediction and a conversion ratio of the switched capacitor voltage regulator 64. In some embodiments of the electronic system 60, the switched capacitor voltage regulator 64, the control interface 68, and the CPU load 66 may be co-located on a same integrated circuit die. For example, the integrated circuit including the switched capacitor voltage regulator 64, the processor 66, and the control interface 68 may be a system-on-a-chip (SOC).

For example, the control interface 68 may generate a corresponding voltage reference for the intermediate voltage $V_M(x, y)$ based on CPU performance demands such as CPU VID, CPU load range/prediction, and SCVR conversion ratio of n/m. For example, the control interface 68 may include a look-up table to select a duty cycle for the buck VR 62 based on one or more of the various inputs. The duty cycle of the buck VR 62 can be fine tuned, providing corresponding fine tuning of the SCVR input voltage, the intermediate voltage of $V_M(x, y)$. Advantageously, the CPU supply voltage, $V_{OUT}$, can be well regulated in a broad range even under a fixed conversion ratio of SCVR. In addition, adjusting the intermediate voltage $V_M$ can cause the SCVR to operate at more efficient or substantially optimally efficient discrete voltage conversion ratios of n/m. Advantageously, some embodiments of the invention may overcome the problem of SCVR power loss under fine grain voltage regulation.

Figure 7:
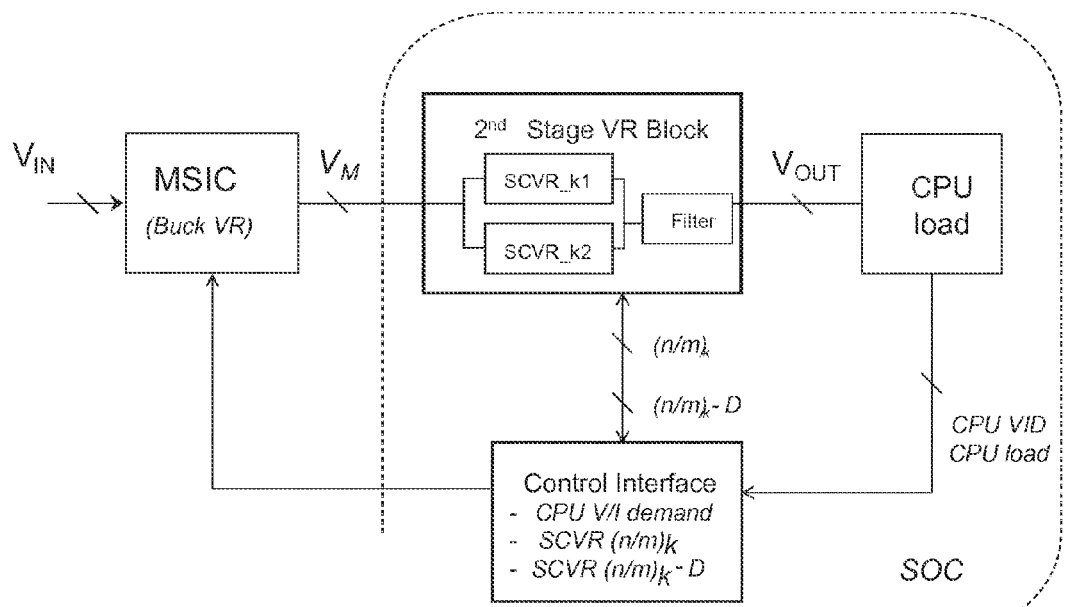
FIG. 7 is a block diagram of another voltage regulator device in accordance with some embodiments of the invention.
Figure 8:
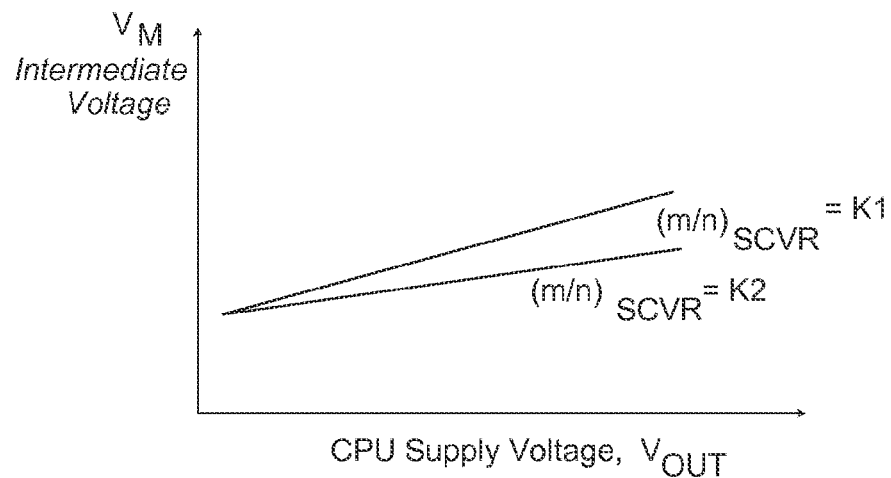
FIG. 8 is another graph of CPU supply voltage versus an intermediate voltage in accordance with some embodiments of the invention.
Figure 9:
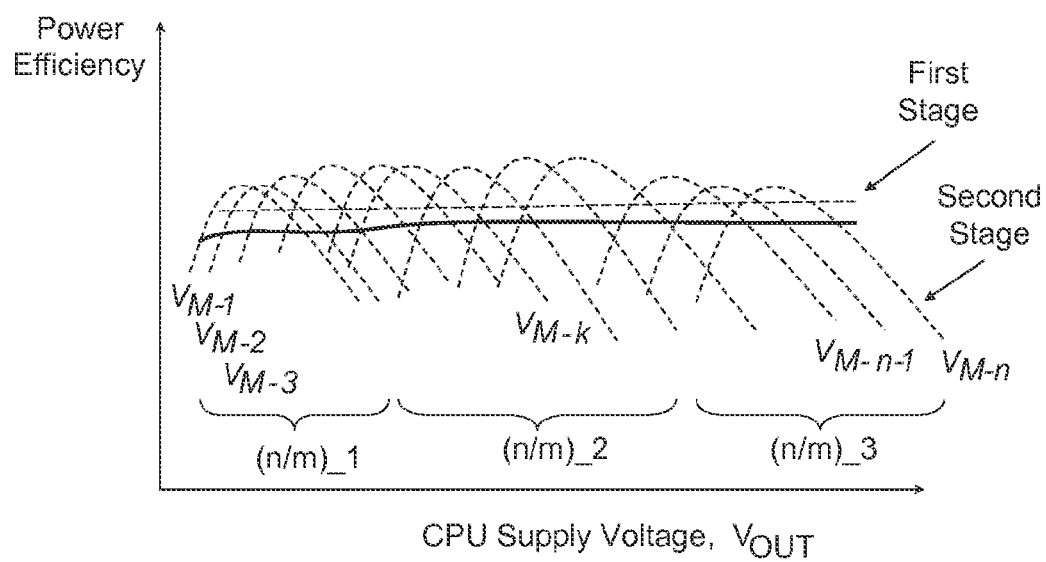
FIG. 9 is another graph of CPU supply voltage versus power efficiency in accordance with some embodiments of the invention.

With reference to FIG. 7-9, in accordance with some embodiments of the invention, an electronic system may include a mixed signal integrated circuit (MSIC) including a buck VR as a first stage of a cascaded voltage regulator arrangement. A second stage of the cascaded VR may include two or more SCVRs having different conversion ratio constants (e.g. corresponding to the two solid lines in FIG. 8). In addition to selecting a desired $V_M$ as an input to the SCVR, the control interface can also select a desired conversion ratio for the SCVR based on CPU needs. For the 1st stage of the cascade VR (e.g. the buck converter), the power efficiency is not impacted directly, at least in the first order, by its output voltage (or $V_M$) under a normal range of CPU applications (e.g. corresponding to the substantially horizontal dashed line in FIG. 9, labeled First Stage). For example, commercially available buck VRs can be 85%±2% efficient within a specified voltage regulation range of 3V~1V, By adjusting the conversion ratio and/or intermediate voltages, an optimal or relatively high efficiency voltage point can be selected for the second stage (e.g. corresponding to the multiple curved dashed lines in FIG. 9, labeled Second Stage). Therefore, an overall combined power efficiency of the cascaded Buck VR and SCVR may be maintained at a relative high level regardless at any regulated output voltage (e.g. corresponding to the solid line in FIG. 9). Advantageously, some embodiments of the invention may provide fine grain voltage regulation and high efficiency of power delivery at any regulated voltage by tuning the intermediate voltage and/or properties of the VRs on-the-fly according to CPU requirements.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A method of operating a cascaded voltage regulator, comprising:
    providing a first stage of the cascaded voltage regulator including a buck converter;
    receiving an input voltage at an input of the buck converter;
    providing an intermediate voltage at an output of the buck converter;
    providing a second stage of the cascaded voltage regulator including a first switched capacitor voltage regulator having a first conversion ratio constant and a second switched capacitor voltage regulator having a second conversion ratio constant;
    receiving the intermediate voltage at an input of the second stage of the cascaded voltage regulator;
    providing an output voltage from a filter coupled to the first and second switched capacitor voltage regulators to a load;
    providing a controller;
    receiving at the controller, information related to a desired output voltage for the second stage of the cascaded voltage regulator;
    determining a desired intermediate voltage and first and second conversion ratio constants for the second stage of the cascaded voltage regulator based on the desired output voltage; and
    adjusting the intermediate voltage and first and second conversion ratio constants based on control information received from the controller.

2. The method of operating a cascaded voltage regulator of claim 1, further comprising providing fine grain voltage regulation by tuning the intermediate voltage and first and second conversion ratios on-the-fly.

3. The method of operating a cascaded voltage regulator of claim 1, further comprising:
    providing control information related to the desired intermediate voltage and first and second conversion ratio constants to the first stage of the cascaded voltage regulator.

4. The method of operating a cascaded voltage regulator of claim 1, wherein providing the output voltage from the filter to the load comprises providing the output voltage from the filter to a processor, and wherein the information related to the desired output voltage includes information related to processor performance demands.

5. The method of operating a cascaded voltage regulator of claim 1, wherein determining the desired intermediate voltage and first and second conversion ratio constants for the second stage of the cascaded voltage regulator based on the desired output voltage comprises determining the desired intermediate voltage and first and second conversion ratio constants based on information related to one or more of a processor voltage identification and a processor load prediction.

6. An electronic system, comprising:
a cascaded voltage regulator comprising:
a first stage including a buck voltage regulator to receive an input voltage and to output an intermediate voltage; and
a second stage including two or more switched capacitor voltage regulators each to receive the intermediate voltage and a filter to provide an output voltage;
wherein each switched capacitor voltage regulator has an independent conversion ratio constant;
a load circuit coupled to the output voltage; and
a control unit coupled between the load circuit and the first stage of the cascaded voltage regulator, wherein the control unit is to receive information related to a desired output voltage for the second stage of the cascaded voltage regulator and to determine a desired intermediate voltage and conversion ratio constants for each switched capacitor voltage regulator in the second stage of the cascaded voltage regulator based on the desired output voltage;
wherein the control unit is further to provide control information related to the intermediate voltage and conversion ratio constants to the first stage of the cascaded voltage regulator, and
wherein the first stage of the cascaded voltage regulator is to adjust the intermediate voltage and the conversion ratio constants based on the control information received from the control unit.

7. The electronic system of claim 6, wherein the electronic system provides fine grain voltage regulation by tuning the intermediate voltage and conversion ratio constants on-the-fly according to processor requirements.

8. The electronic system of claim 6, wherein the load includes a processor and wherein the information related to the desired output voltage includes information related to processor performance demands.

9. The electronic system of claim 6, wherein the control unit is to determine the desired intermediate voltage and conversion ratio constants based on information related to one or more of a processor voltage identification and a processor load prediction.

10. The electronic system of claim 6, wherein the second stage of the cascaded voltage regulator, the control unit, and the processor are co-located on a same integrated circuit die.

* * * * *